United States Patent [19]

Perfetti et al.

[11] 4,125,670

[45] Nov. 14, 1978

[54] THERMOSETTING ORGANIC COATED METALLIC SHEET

[75] Inventors: Guido A. Perfetti; Henry Darlington, both of Bethlehem, Pa.

[73] Assignee: Bethlehem Steel Corporation, Bethlehem, Pa.

[21] Appl. No.: 786,907

[22] Filed: Apr. 12, 1977

Related U.S. Application Data

[60] Division of Ser. No. 603,462, Aug. 11, 1975, Pat. No. 4,032,678, which is a continuation-in-part of Ser. No. 505,302, Sep. 12, 1974, abandoned.

[51] Int. Cl.[2] .......................... B32B 15/18; B32B 27/16

[52] U.S. Cl. .......................................... 428/626; 428/450; 428/451; 428/459; 428/458; 428/460; 428/461; 428/462; 428/463; 428/467; 428/483; 428/484; 428/517; 428/518; 428/520; 428/418

[58] Field of Search .................... 427/388 A, 379, 401; 428/460, 458, 461, 462, 418, 467, 459, 463, 483, 484, 450, 451, 517, 518, 520

[56] References Cited

U.S. PATENT DOCUMENTS

| | | | |
|---|---|---|---|
| 3,177,092 | 4/1965 | Meyers et al. | 428/467 X |
| 3,258,319 | 6/1966 | Cox, Jr. | 428/467 |
| 3,932,144 | 1/1976 | Matsubara et al. | 428/418 X |
| 4,046,937 | 9/1977 | McCaskey, Jr. et al. | 428/461 X |

*Primary Examiner*—P. C. Ives

*Attorney, Agent, or Firm*—Joseph J. O'Keefe; Michael J. Delaney; Anson W. Biggs

[57] ABSTRACT

Sheet metal having a partially cured organic thermosetting coating thereon and method of forming drawn and ironed seamless containers therefrom.

5 Claims, 4 Drawing Figures

THERMOSETTING ORGANIC COATED METALLIC SHEET

CROSS REFERENCE TO RELATED APPLICATIONS

This application is a division of U.S. application Ser. No. 603,462 filed Aug. 11, 1975, now U.S. Pat. No. 4,032,678 which is a continuation-in-part of U.S. application Ser. No. 505,302, filed Sept. 12, 1974, now abandoned.

BACKGROUND OF THE INVENTION

The development of a competitive container suitable for beer and soft drinks and other foodstuffs has been udner study recently by the industries concerned. It is an economic fact that the least expensive container will dominate the market. Drawn and ironed two-piece containers or cans made from aluminum and tinplate are known and appear to be competitive from a price standpoint. The search continues for an even less expensive can.

One way to reduce the metal cost of steel cans is to use blackplate, the base material which is coated with tin to produce tinplate. However, the use of blackplate for drawn and ironed cans presents several problems. These problems include: blackplate rusting during shipment and storage, costly lubrication procedures required for ironing, difficulty of cleaning the ironing lubricant from the ironed cans, and requirement of additional coating materials to fully finish the inside of the can.

SUMMARY OF THE INVENTION

It is an object of this invention to provide a thermosetting organic coated metallic sheet product suitable for use in manufacturing drawn and ironed seamless containers.

It is a further object of the invention to provide a thermosetting organic coated metallic sheet product for use in manufacturing drawn and ironed seamless containers which eliminates current processing steps such as adding lubricant to aid in forming of the container and the subsequent removal of such lubricant.

It is also an object of this invention to provide a method for forming drawn and ironed seamless containers wherein the interior of the container is suitably coated for immediate use or such coating serves as a precoat for a final topcoat.

The instant invention accomplishes these objects by providing a unique thermosetting organic coated sheet metal product having a partially cured coating which bonds to the metallic substrate and provides sufficient lubricity and extensibility to draw and iron the sheet metal product into a seamless container.

It has been found that a thermosetting organic coating applied to blackplate and partially cured as hereinafter described results in a product having characteristics which overcome the above-mentioned problems. For example, the coating provides rust resistance during shipment and storage and lubrication for drawing and ironing, thereby eliminating the need for the addition of lubricants during drawing and ironing. Thus, the step of cleaning the lubricant from the ironed can is eliminated. The organic coated blackplate also provides a suitable undercoat for final inside coating and outside decorating of the can. In addition to reducing the metallic substrate cost, the use of the organic coated blackplate of this invention can be expected to reduce the overall cost of producing two-piece containers, e.g. drawn and ironed cans.

DETAILED DESCRIPTION OF THE DRAWINGS

Figure 1:
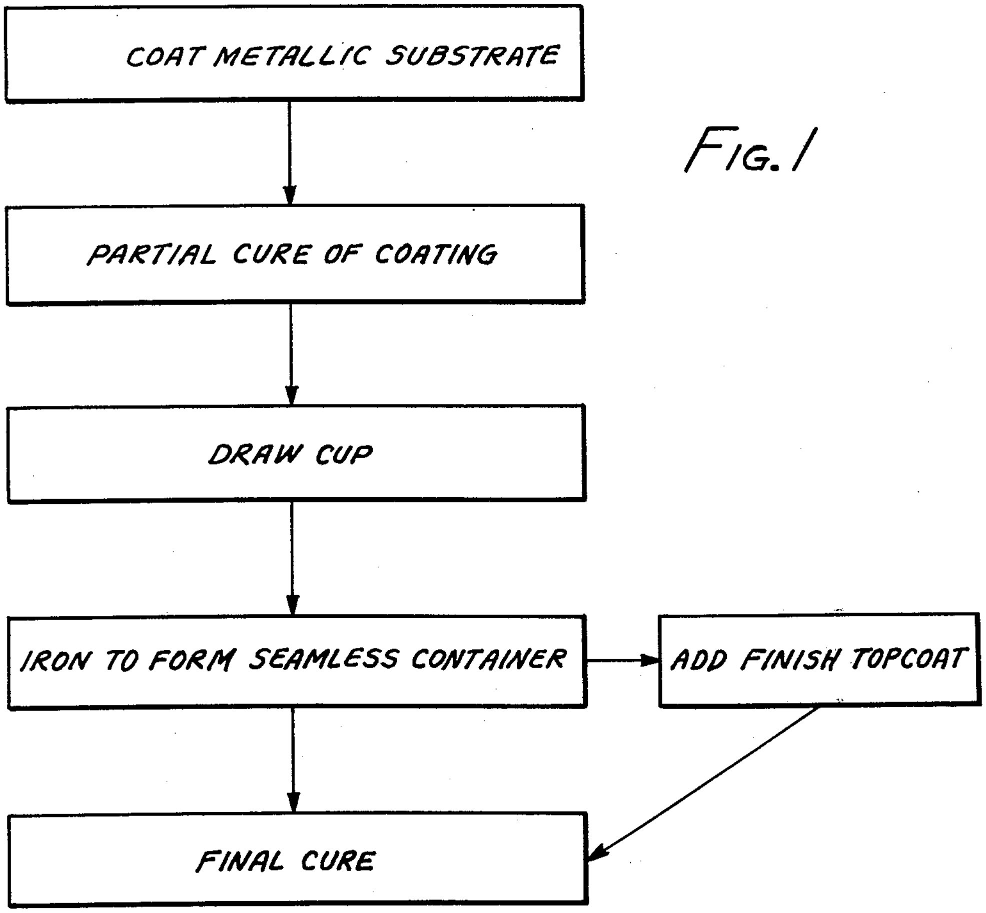
FIG. 1 is a schematic flow diagram of the method of the instant invention.

FIG. 1 shows a schematic flow diagram including the steps of coating a metallic substrate, partially curing the coating, drawing a cup from the substrate, ironing the cup to form a seamless container and finally curing the coating. An alternate step between the ironing and final curing is adding a finish topcoat to the seamless container. The details of such steps are set forth below.

Figure 2:
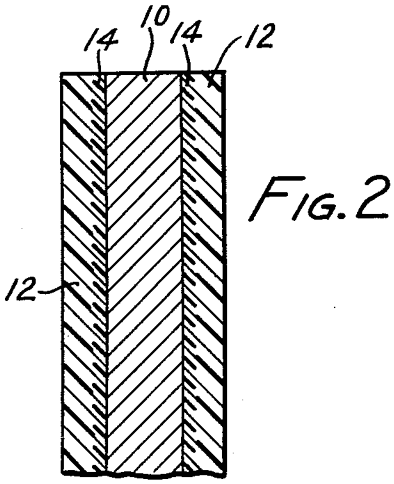
FIG. 2 is a cross-section of a portion of the organic coated sheet metal of the instant invention.

FIG. 2 shows a metallic substrate 10, coating layer 12 and an intermediate layer 14 wherein the coating 12 and substrate 10 are bonded together.

Figure 3:
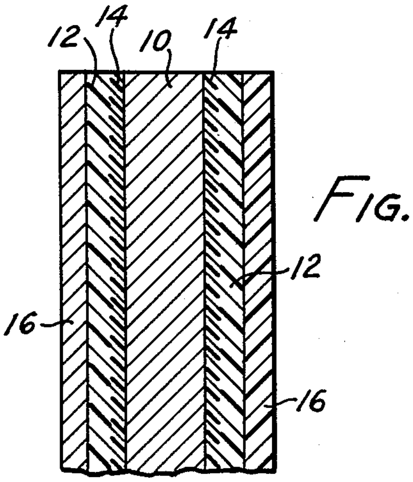
FIG. 3 is a cross-section of a portion of the organic coated sheet metal article which has been ironed and topcoated.

FIG. 3 shows a metallic substrate 10, a coating layer 12, an intermediate layer 14 wherein the coating 12 and the substrate 10 are bonded together and topcoat 16.

Figure 4:
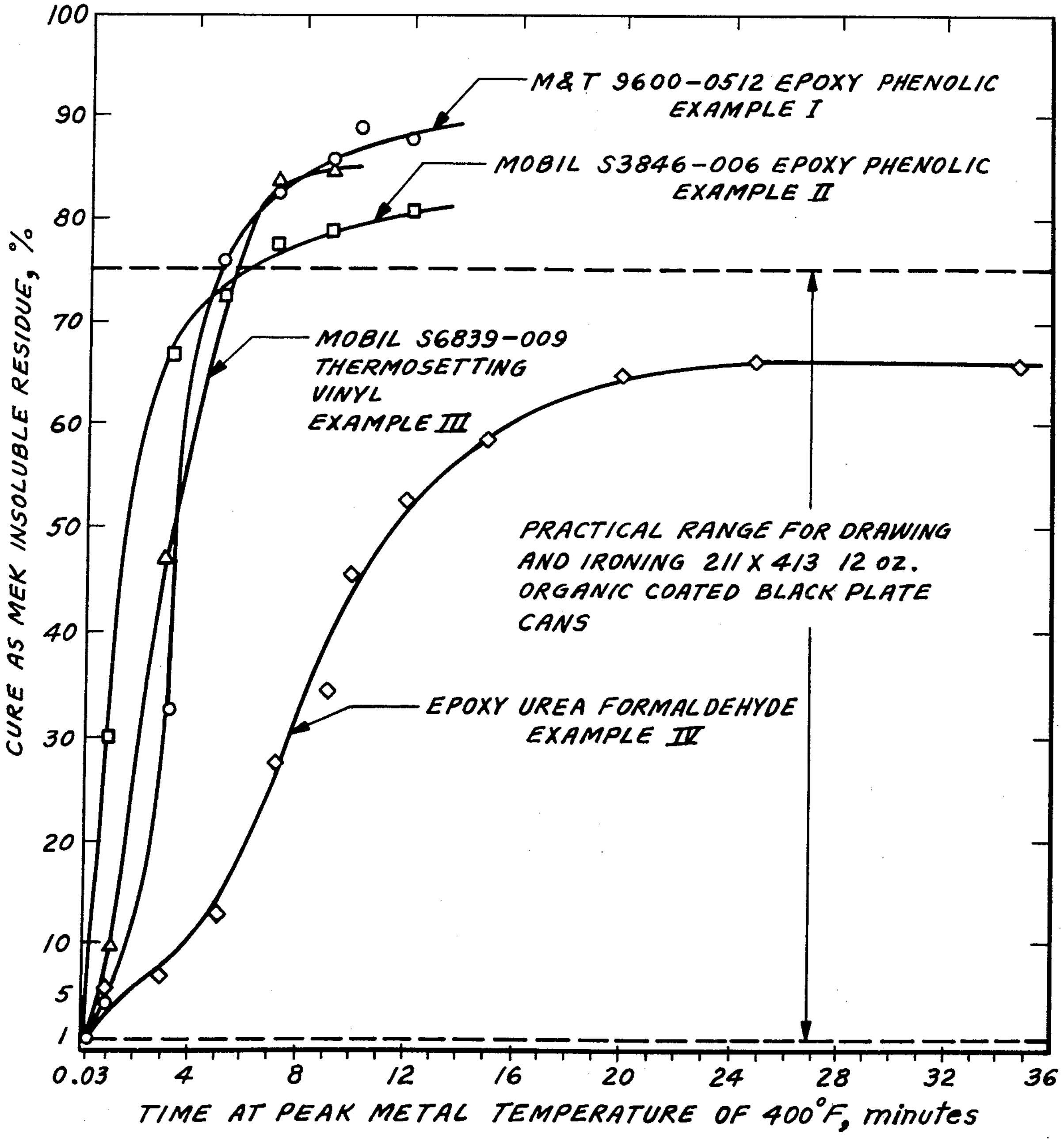
FIG. 4 is a graphical representation of cure characteristics of various organic coatings.

FIG. 4 depicts graphically the cure characteristics of various organic coatings applied to a metallic substrate and heated to a peak metal temperature of 400° F. and thereafter maintained at that temperature for various time intervals. The percent MEK insoluble residue, as hereinafter described, is a measure of the cure of the organic coatings.

DESCRIPTION OF THE PREFERRED EMBODIMENT

A clear understanding of the instant invention and alternate embodiments will be accomplished through the following description with reference to the appropriate drawing figures.

Substrate

The choice of metallic substrate for the bulk of the experiments relating to the instant invention was blackplate because it is the least expensive metal available for containers. The material used was blackplate of aluminum-killed steel composition. The invention is equally applicable for all basis weights and steel grades of blackplate, electrolytic chromium-coated steel and tinplate and to certain metals other than steel, e.g. copper and aluminum.

Organic Coating

The organic coating applied to the substrate may comprise any thermosetting polymeric or resinous composition, such as, for example, alkyds, vinyls, phenolics, polybutadiene, polyvinyl butyral, polyesters, acrylics and epoxies. Of these, the thermosetting epoxy phenolics are most suited to be used as the organic coating applied to the substrate.

The partially cured organic coating must bond to the substrate, provide adequate forming lubricity to exhibit a can surface acceptable to a can make, show good extensibility i.e. the ability to elongate with the metal substrate without becoming detached from the metal, and be receptive to protective and/or decorative coatings applied thereon as the top or finish coat. An ideal coating would be one that is wholly self-lubricating, thereby allowing one to perform all essential forming operations without any additional lubricant.

Internal lubricants may be added to the organic coating material before it is applied to the substrate, that is, while the organic coating material is still fluid. Examples of these internal or secondary lubricants now being satisfactorily employed in forming organic coated metals are natural and synthetic waxes, petrolatum, lanolin, silicone derivatives, hydrocarbon prepolymers, polyethylene, and certain synthetic esters. Choice of lubricant is governed largely by the polymeric or resinous composition to which suc lubricant is added and amount of lubricity required of the organic coating. An important benefit of adding internal lubricant to the coating is the elimination of external lubricants used during can forming operations.

A preferred internal lubricant is a synthetic ester marketed by Mobil Chemical Company (Pittsburgh, Pa.) as a can lining lubricant and identified by Mobil Chemical Company by number S-6661-003. This ester is made from a monomeric polyhydric alcohol having 3 to 6 hydroxyls and a 14 to 20 carbon fatty acid. This internal lubricant is added to the liquid organic coating material in an amount such that between 6% and 35% by weight of the synthetic ester is present in the film formed after the organic coating material dries. The amount of such internal lubricant may be varied in accordance with the amount of ironing reduction required in a can forming operation as is well known to one skilled in the art.

An advantage of an internal lubricant is that one amount of such lubricant can be added to the organic coating material on one side of a metal substrate while a greater or lesser amount of such lubricant is applied to the organic coating material on the other side of the metal substrate. Thus an organic coated metal substrate having differentially lubricated sides can be provided. Such differential lubrication is a distinct advantage in some can forming operations.

As hereinbefore noted, while an internal lubricant can be applied to the organic coating material, if desired, an external lubricant, one which is applied during the drawing and ironing operations either to the tools or the sheet, can be used during the can forming operation instead of such internal lubricant.

The organic coating may be applied to the sheet metal substrate by ordinary modes of applying coating to sheet or strip including direct-roll coating, reverse-roll coating, dip coating, spraying and electrostatic spraying.

Partial Cure of Organic Coating

Within the context of this invention a partial cure of the thermosetting organic coating can be most easily understood in the light of what is meant by a "full or complete cure" of such coating.

The term full or complete cure means that there is a conversion of the coating material, usually by heating, whereby the chemically active groups of the applied coating material react with each other to form a new substance. The new substance thus formed has markedly different chemical and physical properties from the coating material as applied. When the reaction just described is carried to completion, that is, when reasonable heating will not cause any further chemical change to take place, the coating is judged to be fully or completely cured.

In contrast to full cure, a partial cure of a coating, the essential feature of this invention, in effect is stopping the reaction short of the full cure that must be provided before conversion of the coating is complete. By interrupting the cure of thermosetting organic coatings, it is possible to add a new dimension to these coatings: that of primary lubrication for the drawing and ironing process used for the manufacture of two-piece cans.

Coatings marketed for can use all come from a vendor with a recommended cure schedule. The cure schedule is intended to fully cure the coating. With few exceptions such coatings are liquid, most of which comprise thermosetting resin, and therefore must be heated after they are applied to effect necessary curing. Most heating schedules are in the range of 360° F. to 410° F. The majority of these call for 400° F. metal temperature and 10 minutes total residence time in a conventional wicket type sheet baking oven. Time/temperature equivalents for other heating devices, more particularly those used for processing strip, are extrapolations of those used with a wicket type heating oven.

Starting with this knowledge and a suitable but not necessarily a similar heating device one can readily devise a schedule for partially curing almost any thermosetting organic coating as follows:

Preset the oven so as to maintain the desired or recommended oven temperature, e.g., 400° F. Provide test panels of a metallic substrate. Coat both sides of the test panels with the coating under investigation, insert the freshly coated test panels in the oven, and allow time (1) to evaporate solvent from the coating and (2) for the metal to come to temperature. Thermocouples attached to the test panels at various locations are a good way to calibrate the oven and standardize the heating operation. When the test panels reach temperature, which should be in about two minutes or less, the isothermal heating (bake) time begins. These test panels can be treated through a progression of convenient heating times, e.g., 1, 3, 5, 7, 9, etc. minutes. Test panels prepared as above and then cooled in ambient air, or cooled more rapidly in a blast of air or in water if the coating is not fragile, can then be tested for can formability with machinery and tooling intended for this purpose. The results of the forming test and quality of the formed can will point to the partial cure schedule which is most suitable to that particular coating.

Taking an epoxy phenolic coating and employing the 400° F. bake temperature recommended by the coating manufacturer, we coated a first side of the test panels made from blackplate so as to arrive at about 20 mg/4 $in^2$ dry film weight. These were inserted into a small batch oven already preset to 400° F. and were heated for 30 seconds from the time of insertion. The test panels attained a temperature of 200° F. and were removed and air cooled to room temperature. The first sides were treaed in such manner so as to cause the coatings on the first sides to harden enough to permit the test panels to be turned so as to allow the opposite or second sides of the test panels to be coated.

The second sides were treated the same way as the first sides except that the test panels were heated to a temperature of 400° F., which took two minutes. After reaching 400° F. some of the test panels were removed from the oven at each of several different time intervals, i.e. 1, 3, 5, 7, 9 and 12 minutes. It was found that cans having acceptable surface conditions were formed from certain of the test panels. An acceptable surface condition as required by can makers is one that has retained most of the coating and such coating is reasonably smooth and uniform. The acceptable cans had coatings which were partially cured within definite ranges as described below.

A definitive test of the extent of cure of the coating was developed in the laboratory and is referred to herein as the "MEK Insoluble Residue Test".

The first step requires the determination of the exact weight per unit area of the coating on the test panels after the coated test panels are treated as described above. The weight is determined as follows:

A. A disc having a surface area of 4 in.$^2$ per side is cut from the center of a test panel and weighed on an analytical balance.

B. The coating is stripped from both sides of the disc by vigorously hand rubbing the disc with a cloth saturated with methyl ethyl ketone.

C. The disc stripped of its coating is weighed on an analytical balance.

D. The difference between the weight of the coated disc and the weight of the disc stripped of its coating divided by the surface area of the disc, 8 in.$^2$ (4 In.$^2$ per side) provides the exact coating weight per unit area.

The next step in the test is to determine the extent of cure of the coating on the test panels. The extent of cure is determined as follows:

E. A test sample having a surface area of 50 in.$^2$ per side is cut from the center of the test panel and weighed on an analytical balance.

F. The coating weight on the test sample is determined by multiplying the coating weight per unit area determined under (D) above by the surface area of the test sample, 100 in.$^2$ (50 in.$^2$ per side).

G. The test sample is cut into pieces and the pieces are placed in a Soxhlet extractor. The pieces are twisted slightly to prevent contact between adjacent pieces while the pieces are in the extractor.

H. Reagent grade methyl ethyl ketone (MEK) was introduced in the extractor. The MEK was heated and allowed to reflux-recirculate for two hours. After such time the pieces were removed from the extractor and dried overnight in a 120° F. cabinet.

I. The pieces were then weighed on an analytical balance.

J. The weight of the extractables, i.e. materials which were removed from the coating by the Soxhlet extractor, is then determined by subtracting the weight determined under (I) above from the weight determined under (E) above.

K. The weight of insoluble residue remaining on the pieces after treatment in the Soxhlet extractor is determined by subtracting the weight of extractables as determined in (J) above from the coating weight as determined in (F) above.

L. The weight of the insoluble residue as determined in (K) above divided by the coating weight as determined in (F) above times by 100 gives the % MEK insoluble residue on the test sample, a measure of the cure of the coating.

Referring to FIG. 2, if the MEK insoluble residue is for example 30%. the intermediate layer 14 of the coating has been completely cured and has a thickness of 30% of the total thickness of the coating, while layer 12 of the coating has not een comletely cured and has a thickness of 70% of the total thickness of the coating.

Other tests, such as a pencil "hardness" test outlined in "Physical and Chemical Examination Paints, Varnishes, Lacquers and Colors", M. A Gardner and G. G. Sward, Twelfth Ed. 1962 and a hand rub test outlined in "Specification for Conducting a Solvent Hand-Rub Test", Technical Bulletin No. 11-18 of National Coil Coaters Association, were used. However, such pencil hardness and hand rub tests are substantially less definitive in determining the measure of cure of the coating than the MEK Insoluble Residue Test outlined under (A) through (L) above.

It has been found that a thermosetting organic material as described in the examples hereinbelow when applied to a steel substrate and cured within the range of about 1 to about 75% MEK insoluble residue as shown in FIG. 4 and Table I provides an effective coating having sufficient lubricity and extensibility for a can wall ironing operation.

Referring to FIG. 4, thermosetting organic coating materials, including epoxy phenolics, an epoxy urea formaldehyde and a thermosetting vinyl, were applied to blackplate and heated to a temperature of 400° F. for a period of time sufficient to provide a cure of at least 1% as determined by the MEK Insoluble Residue test. Below 1% cure the coating was either in a liquid state or insufficiently bonded to the blackplate for good can forming efficiency. Above about 75% cure, the coating failed during can forming operations probably due to loss of extensibility of the coating. When the coating was cured in the range of between about 1 to about 75% MEK insoluble residue, the coating was bonded to the substrate and had sufficient lubricity and extensibility to allow seamless containers to be formed by drawing and ironing. In forming cans from blackplate having such a coating cured in the range of about 1 to about 75% MEK insoluble residue, a total wall thickness reduction of 70% was attained during ironing.

The thermosetting organic coated blackplate as described herein is packaged for shipment and/or storage for further processing as in a can line at a later date. No rust develops in storage and the coated metal is ready for immediate can line application with no additional cleaning or lubricating steps required.

The process for partial curing of the organic coating to attain good can forming efficiency from a particular coating depends on the organic coating material selected and the characteristics of the additives to such organic coating material such as resin modifiers and solvents. Other parameters of the process to be considered include tolerance of the liquid film of organic coating to blistering or skinning, heat transfer and heating capability of the processing equipment, type and volume of metal substrate.

Drawing and Ironing

The partially cured thermosetting organic coated sheet was blanked into discs which were drawn into cup preforms. The cup preforms were ironed through at least one ironing die to reduce the sidewall thickness of the cup preforms. The forming of the cans was completed by doming the bottoms, trimming to height, and necking-in and flanging the tops, if desired. The necking-in and flanging of the tops can be accomplished after a finish topcoat has been applied to the cans, if desired. The drawing and ironing of the organic coated sheet employed the partially cured coating layer as the primary drawing and ironing lubricant.

Final Cure

After the cans had been formed as described above and if such cans were not to be used for a food or beverage container a final cure of the coating was not necessary. However, if such cans were to be used as food or beverage containers a final cure was necessary. The final cure comprised a further heating of the coating at a time and temperature sufficient to completely cure the coating.

Add Finish Topcoat

The alternate step shown in FIG. 1 comprised applying a topcoat to the drawn and ironed cans described above after the cans had been dried. The type of topcoat applied to either the inside and/or the outside of the cans and the manner in which the topcoat was applied are well known to can makers. Curing time and temperatures necessary for curing the topcoat were adequate to also completely cure the organic coating of the substrate. Such curing times and temperatures were the same times and temperatures recommended by the manufacturers of the topcoats. FIG. 3 shows a cross section of a coated sheet article which includes a topcoat.

SPECIFIC EXAMPLES

The following specific examples will describe with particularity the method of forming coated seamless containers from sheet product comprising a metallic substrate having a partially cured thermosetting organic coating thereon.

Example I

The substrate used in this examples was 0.014 inch thick aluminum-killed blackplate, having an ordinary tin mill finish. One set of steel substrate samples was left dry while another set of samples was lightly oiled, as is customary. An epoxy phenolic formulation marketed by M & T Chemicals Division of American Can Company, (Rahway, N.J.) and identified by No. 9600-0512, was applied to both sets of the metallic substrate samples by roll coating both sides of the substrate to a dry film weight of 10–20 mg/4 in$^2$. The aforementioned epoxy phenolic comprised approximately:

33% by weight solids consisting of about:
- 155 parts by weight epichlorohydrin bisphenol A epoxy resin (medium molecular weight)
- 45 parts by weight allyl ether of methylol phenol resin
- 1 part by weight phosphoric acid catalyst, and 67% by weight solvent consisting of about:
- 5 parts by weight iso-butanol
- 9 parts by weight xylene
- 4 parts by weight pentoxone
- 4 parts by weight diacetone alcohol
- 4 parts by weight isophorone
- 7 parts by weight mesityl oxide The organic coated substrates of both sets of samples were heated in a batch type enameling oven to a temperature of 400° F. and held for 1 minute. The samples were then removed from the oven and air-cooled to room temperature. This heating cycle resulted in the organic coating being partially cured and bonded to the metallic substrates of both sets of samples.

The organic coated metallic substrates of both sets of samples were then blanked in a press into 5.625 inch diameter discs and drawn to 3.200 inch diameter cups in a single stroke through a double action die. The drawn cups were transferred to a second press where in one stroke they were redrawn to 2.562 inch diameter cups and ironed through three progressively smaller dies to a final sidewall thickness of 0.0045 inch, representing about 70% total reduction of sidewall thickness. The can bottom was indented at the end of the stroke to form an internal pressure resisting dome. The drawing and ironing operations were performed without additional lubricant. Both sets of samples were formed into cans having acceptable surface conditions.

The drawn, ironed and domed preforms were trimmed and flanged to the standard height for the 211 × 413, 12-ounce can on a Herlan trimmer/flanger.

The cans were placed in an enameling oven for 8 to 9 minutes at 400° F. as per the coating manufacturer's recommended cure schedule and when removed were completely cured.

Additional examples using the same coating material and substrate of this Example I but different time/temperature relationships were performed. FIG. 4 shows the % cure as determined by the MEK Insoluble Residue Test for such examples. Table I lists the properties of the coatings of such examples and whether or not such coatings allowed drawn and ironed cans with acceptable surface conditons to be formed.

Example II

The substrate used in this example was 0.014 inch thick aluminum-killed blackplate having an ordinary tin mill finish. One set of steel substrate samples was left dry while another set of samples was lightly oiled, as is customary. An epoxy phenolic formulation marketed by Mobil Chemical Company (Pittsburgh, Pa.) and identified as S-3846-006, was applied to both sets of the metallic substrate samples by roll coating both sides of the substrate to a dry film weight of 10–20 mg/4 in$^2$. The aforementioned epoxy phenolic comprised approximately:

32.5% by weight solids consisting of about:
- 3 parts by weight epichlorohydrin bisphenol A resin (Medium molecular weight)
- 2 parts by weight xylenol formaldehyde resin, and 67.5% by weight solvent consisting of about:
- 2 parts by weight cellosolve acetate
- 1 part by weight butanol
- 1 part by weight xylene
- 10 parts by weight methyl iso-butyl ketone
- 6 parts by weight cellosolve The organic coated substrates of both sets of samples were heated in a batch type enameling oven to a temperature of 400° F. and held for 1 minute. The samples were then removed from the oven and air-cooled to room temperature. This heating cycle resulted in the organic coating being partially cured and bonded to the metallic substrates of both sets of samples.

The organic coated metallic substrates of both sets of samples were then blanked in a press into 5.625 inch diameter discs and drawn to 3.200 inch diameter cups in a single stroke through a double action die. The drawn cups were transferred to a second press where in one stroke they were redrawn to 2.562 inch diameter cups and ironed through three progressively smaller dies to a final sidewall thickness of 0.0045 inch, representing about 70% total reduction of sidewall thickness. The can bottom was indented at the end of the stroke to form an internal pressure resisting dome. The drawing and ironing operations were performed without additional lubricant. Both sets of samples were formed into cans having acceptable surface conditions.

The drawn, ironed and domed preforms were trimmed and flanged to the standard height for the 211 × 413, 12-ounce can on a Herlan trimmer/flanger.

The cans were placed in an enameling oven for 8 to 9 minutes at 400° F. as per the coating manufacturer's recommended cure schedule and when removed were completely cured.

Additional examples using the same coating material and substrate of this Example II but different time/temperature relationships were performed. FIG. 4 shows % cure as determined by the MEK Insoluble Residue Test for such examples. Table I lists the properties of the coatings of such examples and whether or not such coatings allowed drawn and ironed cans with acceptable surface conditions to be formed.

Example III

The substrate used in this example was 0.014 inch thick aluminum-killed blackplate having an ordinary tin mill finish. One set of steel substrate samples was left dry while another set of samples was lightly oiled, as is customary. A thermosetting vinyl marketed by Mobil Chemical Company (Pittsburgh Pa.) identified as No. S-6839-009, was applied to both sets of the metallic substrate samples by roll coating both sides of the substrate to a dry film weight of 10–20 mg/4 $in^2$. The S-6839-009 thermosetting vinyl comprised approximately:

- 22% by weight solids consisting of about:
  - 7 parts by weight vinyl solution resin (91% vinyl chloride, 3% vinyl acetate, 6% vinyl alcohol)
  - 2 parts by weight epichlorohydrin bisphenol A epoxy resin (low molecular weight)
  - 1 part by weight urea formaldehyde resin, and
- 78% by weight solvent consisting of about:
  - 10 parts by weight high boiling aromatic naphtha
  - 8 parts by weight isophorone
  - 1 part by weight methyl iso-butyl ketone
  - 1 part by weight butanol The organic coated substrates of both sets of samples were heated in a batch type enameling oven to a temperature of 400° F. and held for 1 minute. The samples were then removed from the oven and air-cooled to room temperature. This heating cycle resulted in the organic coating partially cured and bonded to the metallic substrates of both sets of samples.

The organic coated metallic substrates of both sets of samples were then blanked in a press into 5.625 inch diameter discs and drawn to 3.200 inch diameter cups in a single stroke through a double action die. The drawn cups were transferred to a second press where in one stroke they were redrawn to 2.562 inch diameter cups and ironed through three progressively smaller dies to a final sidewall thickness of 0.0045 inch, representing about 70% total reduction of sidewall thickness. The can bottom was indented at the end of the stroke to form an internal pressure resisting dome. The drawing and ironing operations were performed without additional lubricant. Both sets of samples were formed into cans having acceptable surface conditions.

The drawn, ironed and domed preforms were trimmed and flanged to the standard height for the 211 × 413, 12-ounce can on a Herlan trimmer/flanger.

The cans were placed in an enameling oven for 8 to 9 minutes at 400° F. as per the coating manufacturer's recommended cure schedule and when removed were completely cured.

Additional examples using the same coating material and substrate of this Example III but different time/-temperature relationships were performed. FIG. 4 shows the % cure as determined by the MEK Insoluble Residue Test for such examples. Table I lists the properties of the coatings of such examples and whether or not such coatings allowed drawn and ironed cans with acceptable surface conditions to be formed.

Example IV

The substrate used in this example was 0.014 inch thick aluminum-killed blackplate having an ordinary tin mill finish. One set of the steel substrate samples was left dry while another set of samples was lightly oiled, as is customary. An epoxy urea formaldehyde was applied to both sets of the metallic substrate samples by roll coating both sides of the substrate to a dry film weight of 10–20 mg/4 $in^2$. The aforementioned epoxy urea formaldehyde comprised approximately:

- 38% by weight solids consisting of about:
  - 225 parts by weight epichlorohydrin bisphenol A epoxy resin (medium molecular weight)
  - 39 parts by weight urea-formaldehyde resin (50% solids in 1/1 butanol/xylene)
  - 6 parts polyvinyl butyral
- 62% by weight solvent consisting of about:
  - 2 parts by weight butanol
  - 4 parts by weight xylene
  - 12 parts by weight cellosolve acetate
  - 5 parts by weight low boiling aromatic naphtha
  - 2 parts by weight nitropropane
  - 6 parts by weight pine oil
  - 5 parts by weight isophorone The organic coated substrates of both sets of samples were heated in a batch type enameling oven to a temperature of 400° F. and held for 1 minute. The samples were then removed from the oven and air-cooled to room temperature. This heating cycle resulted in the organic coating being partially cured and bonded to the metallic substrates of both sets of samples.

The organic coated metallic substrates of both sets of samples were then blanked in a press into 5.625 inch diameter discs and drawn to 3.200 inch diameter cups in a single stroke through a double action die. The drawn cups were transferred to a second press where in one stroke they were redrawn to 2.562 inch diameter cups and ironed through three progressively smaller dies to a final sidewall thickness of 0.0045 inch, representing about 70% total reduction of sidewall thickness. The can bottom was indented at the end of the stroke to form an internal pressure resisting dome. The drawing and ironing operations were performed without additional lubricant. Both sets of samples were formed into cans having acceptable surface conditions.

The drawn, ironed and domed preforms were trimmed and flanged to the standard height for the 211 × 413, 12-ounce can on a Herlan trimmer/flanger.

The cans were placed in an enameling oven for 8 to 9 minutes at 400° F. as per the coating manufacturer's recommended cure schedule and when removed were completely cured.

Additional examples using the same coating material and substrate of this Example IV but different time/-temperature relationships were performed. FIG. 4 shows the % cure as determined by the MEK Insoluble Residue Test for such examples. Table I lists the properties of the coatings of such examples and whether or not such coatings allowed drawn and ironed cans with acceptable surface conditions to be formed.

Example V

The coating material and substrate were the same as in Example I The substrate temperature was increased to 400° F. and held for 1 minute. The sample was then removed from the oven and air-cooled to room temperature. The can forming operation was the same as in Example I except that (a) during the drawing of the cups a mixture of water and 5 to 7% by volume of Detrex Roll Oil T, marketed by Detrex Chemical Industries, Inc. (Detroit, Michigan), a tin mill rolling oil made from beef tallow, was applied as an external lubricant at the cupping press and recirculated in the ironing press and after ironing the cans were rinsed in water at 105° F. prior to final curing. The addition of this external lubricant resulted in the formation of cans having smoother and more uniform surface conditions than those of Examples I–IV.

Example VI

The coating material, substrate and can forming operations were the same as in Example I except that 200 grams of Mobil Chemical Co. synthetic ester S-6661-003, ester which is made from a monomeric polyhydric alcohol having 3 to 6 hydroxyls and a 14 to 20 carbon fatty acid, referred to above were added as an internal lubricant to each gallon of liquid epoxy phenolic prior to its application to the substrate. The substrate temperature was increased to 400° F. and held for 1 minute. The sample was removed from the oven and air-cooled to room temperature. The addition of this internal lubricant resulted in the formation of cans having smoother and more uniform surface conditions than those of Examples I–IV.

CONCLUSION

It would be expected that similar results could be accomplished by using other compatible external and/or internal lubricants with the other coatings mentioned hereinbefore.

Referring to FIG. 4, the practical cure range for drawing and ironing 211 × 413, 12-ounce organic coated blackplate cans is seen to be about 1% to about 75% MEK insoluble residue.

Below about 1% MEK insoluble residue the thermosetting organic coating has insufficient film strength or bonding with the metallic substrate. Above about 75% MEK insoluble residue the coating lacks sufficient extensibility to produce an acceptable can surface after undergoing the required wall reduction during ironing. Thus FIG. 4 shows that when the MEK insoluble residue range was from 1 to 75% the coating was bonded to the substrate and the coated substrate had sufficient lubricity and extensibility to be successfully drawn and ironed into cans with acceptable surface conditions.

It will be understood by those skilled in the art that other time/temperature relationships may be used to cure thermosetting organic coatings in the range of between about 1 to about 75% MEK insoluble residue.

It is clearly seen that the invention hereinbefore described provides a coating having sufficient lubricity and extensibility for a metal forming process and when no external lubricant is used, subsequent cleaning steps are substantially simplified.

The invention herein described provides a coated sheet product which is easily transported and stored in readiness for fabrication without quality loss due to rusting, oxidizing or staining. In addition the coating of this invention provides an undercoat for topcoat finishing and background after the can is formed. Such coating can be applied at a tin mill or other convenient location.

The advantages of the invention described herein include potential savings in manufacturing costs of containers.

Table I

| Coating | Time at 400° F (min) | Pencil Hardness | MEK Hand Rubs | MEK Insoluble Residue % | Surface Condition of D&I Can* |
|---|---|---|---|---|---|
| | | Example I | | | |
| M&T | 0.03 | 2H | 1 | 1 | A |
| 9600-0512 | 1 | 2H | 1 | 5 | A |
| Epoxy | 3 | 3H | 3 | 33 | A |
| phenolic | 5 | 6H | >50 | 76 | A |
| | 7 | 6H | >50 | 83 | U |
| | 9 | 6H | >50 | 86 | U |
| | 12 | 7H | >50 | 88 | U |
| | | Example II | | | |
| Mobil | 1 | 4H | 1 | 30 | A |
| S-3846-006 | 3 | 4H | 10 | 67 | A |
| Epoxy | 5 | 6H | 20 | 73 | A |
| phenolic | 7 | 6H | 50 | 78 | U |
| | 9 | 6H | >50 | 79 | U |
| | 12 | 6H | >50 | 81 | U |
| | | Example III | | | |
| Mobil | 1 | 2H | 2 | 10 | A |
| S-6839-009 | 3 | 3H | 15 | 47 | A |
| Thermosetting | 5 | 6H | 40 | 68 | A |
| vinyl | 7 | 6H | >50 | 85 | U |
| | 9 | 6H | >50 | 85 | U |
| | | Example IV | | | |
| Epoxy Urea | 1 | 4H | <1 | 6 | A |
| Formaldehyde | 3 | 4H | <1 | 7 | A |
| | 5 | 5H | 2 | 13 | A |
| | 7 | 6H | 2 | 28 | A |
| | 9 | 6H | 2 | 35 | A |
| | 10 | 6H | 2 | 46 | A |
| | 12 | 6H | 2 | 53 | A |
| | 15 | 6H | 10 | 59 | A |
| | 20 | 6H | 30 | 65 | A |
| | 25 | 7H | 30 | 67 | A |
| | 35 | 7H | 35 | 67 | A |

*-A-Acceptable
U-Unacceptable

We claim:

1. A coated sheet metal for use in manufacturing drawn and ironed seamless containers consisting essentially of a metallic substrate coated with a thermosetting organic coating which has been heated for a time to effect a partial cure in the range of between about 1 and about 75% MEK insoluble residue, which cure provides a bond between the coating and the metallic substrate and a coating with the ability to elongate with the metallic substrate without becoming detached from the metallic substrate in a drawing and ironing operation.

2. A sheet product according to claim 1 wherein the metallic substrate is selected from the group consisting of blackplate, electrolytic, chromium-coated container steel, tinplate and aluminum.

3. A sheet product according to claim 1 wherein the thermosetting organic coating include an internal lubricant.

4. A sheet product according to claim 1 wherein the thermosetting organic coating is selected from the group consisting of epoxy phenolic, epoxy urea formaldehyde and a thermosetting vinyl.

5. A sheet product according to claim 4 wherein the metallic substrate is blackplate.

* * * * *